(12) United States Patent
Pakkert et al.

(10) Patent No.: US 8,177,103 B2
(45) Date of Patent: May 15, 2012

(54) PRESSURE REGULATING CONTAINER FOR CARBONATED DRINK

(75) Inventors: Engbert Hermannes Pakkert, Delft (NL); Quintijn Innikel, Hilversum (NL)

(73) Assignee: Heineken Supply Chain B.V., Zoeterwoude (NL)

( * ) Notice: Subject to any disclaimer, the term of this patent is extended or adjusted under 35 U.S.C. 154(b) by 1028 days.

(21) Appl. No.: 10/566,061

(22) PCT Filed: Jul. 15, 2004

(86) PCT No.: PCT/NL2004/000513
§ 371 (c)(1),
(2), (4) Date: Feb. 8, 2008

(87) PCT Pub. No.: WO2005/007560
PCT Pub. Date: Jan. 27, 2005

(65) Prior Publication Data
US 2008/0116230 A1   May 22, 2008

(30) Foreign Application Priority Data

Jul. 21, 2003 (NL) .................................... 1023968

(51) Int. Cl.
*B65D 83/00* (2006.01)
(52) U.S. Cl. .......... 222/399; 222/129.1; 222/145.1; 222/396; 141/5; 141/64; 239/373
(58) Field of Classification Search .......... 222/129.1, 222/135, 145.1, 394–399; 141/5, 64; 239/364, 239/373; 137/315.41–315.42
See application file for complete search history.

(56) References Cited

U.S. PATENT DOCUMENTS

| | | | | | |
|---|---|---|---|---|---|
| 2,090,403 | A | * | 8/1937 | Murray et al. | 62/165 |
| 2,104,467 | A | * | 1/1938 | Marzolf | 62/166 |
| 2,134,852 | A | | 11/1938 | Bogan | |
| 3,024,800 | A | * | 3/1962 | Lewis | 137/209 |
| 3,161,324 | A | * | 12/1964 | O'Neill | 222/61 |
| 3,228,559 | A | * | 1/1966 | Couffer | 222/61 |
| 3,233,780 | A | * | 2/1966 | Cheeley | 222/61 |
| 3,679,104 | A | * | 7/1972 | Giroud | 222/396 |
| 3,762,431 | A | * | 10/1973 | Wilson et al. | 137/116.3 |

(Continued)

FOREIGN PATENT DOCUMENTS

CH    257821    10/1948
(Continued)

OTHER PUBLICATIONS

International Search Report for PCT/NL2004/000513, dated Mar. 14, 2005.

(Continued)

*Primary Examiner* — Kevin P Shaver
*Assistant Examiner* — Andrew Bainbridge
(74) *Attorney, Agent, or Firm* — Abelman, Frayne & Schwab

(57) ABSTRACT

A container that dispenses a carbonated drink such as beer has a pressure regulator that controls the pressure of the dispensed fluid with a pressurized carbon dioxide. The carbon dioxide is released to maintain the desired pressure by a pressure regulator that opens a valve when the pressure is too low in the dispensed fluid and closes a valve when the pressure is high enough in the dispensed fluid. The pressure regulator is easily adjusted without the use of a tool during operation by simply rotating the pressure regulator's cap on its threads.

34 Claims, 2 Drawing Sheets

U.S. PATENT DOCUMENTS

| | | | |
|---|---|---|---|
| 4,402,429 A | | 9/1983 | Vanden Driessche |
| 4,479,520 A | * | 10/1984 | Holben .............................. 141/1 |
| 4,652,023 A | | 3/1987 | Timmons |
| 5,110,012 A | * | 5/1992 | Scholle et al. ................ 222/83.5 |
| 5,246,140 A | | 9/1993 | Thix et al. |
| 5,285,931 A | * | 2/1994 | Alfons ............................. 222/61 |
| 5,415,328 A | * | 5/1995 | Miyazaki ...................... 222/396 |
| 5,439,137 A | * | 8/1995 | Grollier et al. ..................... 222/1 |
| 5,586,571 A | * | 12/1996 | Guillermo ................ 137/315.41 |
| 6,412,668 B1 | | 7/2002 | Vlooswijk et al. |
| 6,415,963 B1 | | 7/2002 | Vlooswijk et al. |
| 6,745,922 B1 | | 7/2004 | Vlooswijk et al. |
| 6,820,775 B2 | | 11/2004 | Meike et al. |
| 6,824,017 B2 | | 11/2004 | Sluijter |
| 7,021,559 B2 | * | 4/2006 | Fraser-Easton ............... 239/302 |
| 2004/0050879 A1 | | 3/2004 | Vlooswijk et al. |

FOREIGN PATENT DOCUMENTS

| | | |
|---|---|---|
| DE | 19802291 | 8/1999 |
| DE | 201 15 158 | 2/2002 |
| DE | 20115158 U | 2/2002 |
| EP | 1256756 | 11/2002 |
| FR | 1 255 526 | 3/1961 |
| JP | 05 296397 | 11/1993 |
| JP | 5296397 | 11/1993 |
| NL | 1012922 | 6/2000 |
| NL | 1012922 C | 6/2000 |
| NL | 1019526 | 1/2002 |
| NL | 1016688 | 5/2002 |
| NL | 1016688 C | 5/2002 |
| NL | 1019054 | 3/2003 |
| NL | 1019054 C | 3/2003 |
| WO | WO 00/03944 | 1/2000 |
| WO | WO 2005/007559 A2 | 1/2005 |
| WO | WO2005/007560 | 1/2005 |
| WO | WO 2005/012157 A1 | 2/2005 |

OTHER PUBLICATIONS

International Search Report and Written Opinion mailed on Nov. 5, 2004 by the European Patent Office in related foreign application No. PCT/NL2004/000514, published as WO 2005/012157.

International Preliminary Report on Patentability, issued Jan. 23, 2006, by the European Patent Office in related foreign application No. PCT/NL2004/000514, published as WO 2005/012157.

International Search Report and Written Opinion mailed on Mar. 14, 2005 by the European Patent Office in counterpart foreign application No. PCT/NL2004/000513, published as WO 2005/007560.

International Preliminary Report on Patentability, issued Jan. 23, 2006, by the European Patent Office in counterpart foreign application No. PCT/NL2004/000513, published as WO 2005/007560.

International Search Report and Written Opinion mailed on Dec. 1, 2004 by the European Patent Office in related European application No. PCT/NL2004/000512, published as WO 2005/007559.

International Preliminary Report on Patentability, issued Jan. 23, 2006, by the European Patent Office in related foreign application No. PCT/NL2004/000512, published as WO 2005/007559;and.

Patent Abstracts of Japan, vol. 018, 090, Feb. 15, 1994 and JP 05 296397.

* cited by examiner

PRESSURE REGULATING CONTAINER FOR CARBONATED DRINK

CROSS-REFERENCE TO RELATED APPLICATIONS

This is a 371 of international application number PCT/NL2004/000513, filed on Jul. 15, 2004, which is incorporated herein by reference in its entirety.

BACKGROUND OF THE INVENTION

1. Field of the Invention

The invention relates to a container for carbonated drink provided with a chamber containing the drink, a drink dispensing opening for dispensing drink from the chamber, a pressure medium chamber that is in fluid communication with the chamber for supplying pressure medium to the chamber, which pressure medium chamber has an outlet that is closed off by a delivery valve for delivering pressure medium and a pressure regulating element connected to the delivery valve for operating the delivery valve.

The invention also relates to a pressure regulating element and a method for filling a container with carbonated drink.

2. Description of the Related Art

It is known to supply pressure medium, such as $CO_2$, to containers, such as metal containers containing whipped cream or cans of beer, by means of a $CO_2$ cartridge containing $CO_2$ under high pressure, such as 50 bar and higher. The volume of the $CO_2$ cartridge is relatively small and a large proportion of the $CO_2$ will escape on connecting if the connection is not made quickly and in a sealed manner. The seals for the high-pressure $CO_2$ cartridges and the pressure regulation thereof is relatively complex. Furthermore, with the known devices there is no facility for the user to set a regulating pressure.

A beer keg in which a pressure medium chamber is formed by a cavity in the keg is also disclosed in Gebrauchsmusterschrift DE 201 15 158 U1. A separate dispensing head that contains a pressure regulator can be connected by the user to a beer dispensing valve and to a $CO_2$ delivery valve. When the dispensing head is connected the pressure medium chamber is connected to the beer chamber in the keg. The pressure regulating element is not indicated in more detail.

Furthermore, a container for beer in which the beer is packed in a flexible bag, which bag is accommodated in a rigid plastic container, is disclosed in NL-A 1019054 in the name of the Applicant. The container is placed in a dispenser which is provided with a compressor that is connected to the container to build up pressure in the space between the flexible bag and the rigid outer container. The use of a compressor in the dispenser makes this relatively complex, while the compressor can give rise to vibration and an increased noise level.

BRIEF SUMMARY OF THE INVENTION

One aim of the present invention is to provide a container for carbonated drink, from which the drink can be dispensed without the use of pressure means to be connected separately, such as a compressor known from the state of the art or carbon dioxide gas cylinders.

A further aim of the invention is to supply a relatively simple pressure regulating element for a container for carbonated drink that is effective at relatively low pressure. It is also an aim of the invention to provide a pressure regulating element that can be mechanically connected to the container for carbonated drink in an efficient manner, in particular in a process for filling the container with carbonated drink, such as in a fill line for beer. A further aim of the invention is to provide a pressure regulating element that can be adjusted by the user.

To this end the container according to the invention is characterized in that the pressure regulating element has a housing with an end wall, a peripheral wall and a piston that can be moved in the housing along the peripheral wall in a sealed manner, wherein an upper housing part is formed between a side of the piston that faces the end wall and the end wall and a lower housing part that at least partially surrounds the delivery valve is formed at the side of the piston facing away from the end wall, wherein the piston engages on the delivery valve and wherein the upper housing part of the housing is in fluid communication with a reference pressure source.

The relatively simple pressure regulator according to the invention can be coupled to the pressure medium container in a simple manner. The pressure medium container can, for example, be connected to the container, for example by a wall of a top part, side part or bottom part. Preferably, however, the pressure medium container is accommodated in the chamber for carbonated drink. The pressure regulating element according to the invention is suitable for use at relatively low pressures, lower than 20 bar, preferably lower than 10 bar. Accurate pressure regulation of the carbon dioxide gas pressure in the chamber, at a few bar overpressure with respect to the reference pressure source, which, for example, is ambient pressure, is possible using the pressure regulating element according to the invention, without the use of complex gas seals.

In one embodiment a spring element is accommodated between the end wall of the housing of the pressure regulating element and the piston. As a result the delivery valve of the pressure medium chamber is pretensioned and the pressure regulating range of the pressure regulating element can be adjusted in a simple manner by setting the spring tension. In one embodiment the upper housing part of the pressure regulating element comprises a cylindrical wall with a screw thread and a cap that is joined to the cylindrical wall by a complementary screw thread, wherein the volume of the upper housing part is variable by moving the cap along the cylindrical wall for setting the internal pressure in the container. By moving the cap the user can adapt a pressure regulating range in a simple manner and, if desired, a carbonated drink, such as beer, can be tapped from the container under high pressure, with a great deal of frothing, or under low pressure, without much frothing.

The chamber of the container can be provided with an insertion opening for introducing the pressure medium chamber into the chamber, which insertion opening is provided with a connecting element, wherein the pressure regulating element has a complementary connecting element for fixing to the connecting element of the chamber. The chamber can be provided with an activating member, which engages on the pressure medium chamber when the regulator valve is fixed, as a result of which the delivery valve is pressed against the piston.

The pressure regulating element can make up a closure assembly with a drink dispensing valve and can be connected to the pressure medium container. After filling the container with drink, such as in a fill line for beer, the pressure medium container can be placed in the container through the fill opening in the latter and the fill opening can be closed off by connecting the closure assembly to the chamber, via, for example, a liquid-tight screw joint. For this purpose a tool is preferably used in the fill line to effect connection of the closure assembly to the container in such a way that this cannot be removed by a user.

After the closure assembly has been placed in the fill opening, the container is ready for use, for example, for placing in a drink dispenser as described in NL-A 1019054 in the name of the Applicant, it now being possible, however, to dispense with the compressor in the drink dispenser. After connecting a dispensing line to the drink dispensing opening, the contents of the container can be dispensed under the desired pressure.

According to a further embodiment of a container for carbonated drink the drink dispensing opening is closed off by a drink dispensing valve, which drink dispensing opening has been displaced with respect to the axis of the container, wherein a dispensing line is provided with an outflow section located transversely to the axis of the container and a section located in the direction of the axis of the container that engages on the outlet, wherein the distance from the axis of the drink dispensing opening is such that in an inactive position the outflow section is within a periphery of the container and in a dispensing position turned with respect to the inactive position the outflow section protrudes beyond the periphery of the container.

When placed in the transport position, the drink dispensing line is turned about its vertical axis such that it is within the periphery of the container. The container can easily be transported and stored in this position without the risk of damage to the dispensing line. By rotating the drink dispensing line about its vertical axis, the drink dispensing line is positioned outside the periphery of the container, so that the drink can be dispensed therefrom into a glass placed next to the container. A suitable container for this embodiment is, for example, described in NL 1016688 in the name of the Applicant.

BRIEF DESCRIPTION OF THE SEVERAL VIEWS OF THE DRAWINGS

A few embodiments of a container for carbonated drink will be described in more detail by way of example, with reference to the appended drawings. In the drawings.

DETAILED DESCRIPTION OF THE INVENTION

Figure 1:
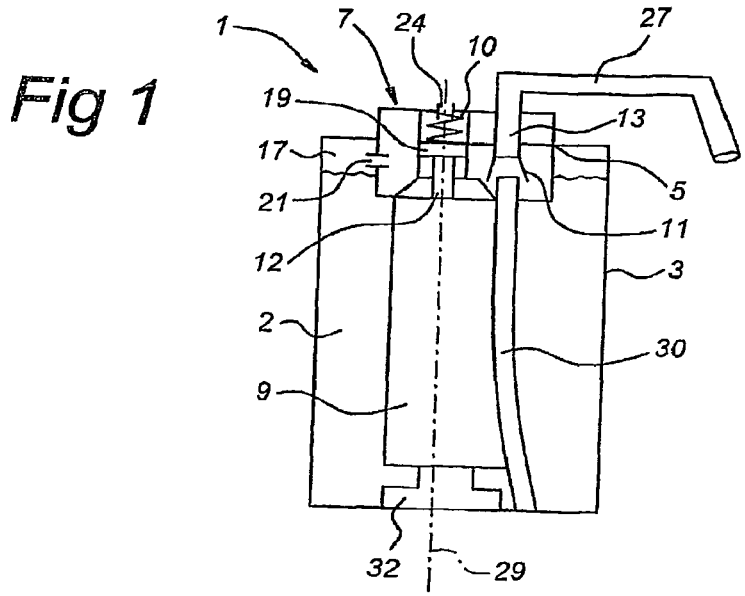
FIG. 1 shows a diagrammatic longitudinal section of a container and a pressure regulating element according to the invention.

FIG. 1 shows a container for carbonated drink 1, such as beer, and as, for example, described in NL-A 1019054. The container can be made of metal or plastic and can be used in a dispenser as described in the abovementioned publication, it being possible, however, to dispense with the compressor for pressurizing the container. In the container 1 there is a chamber 2 containing carbonated drink, preferably beer. In the top wall of the container 1 there is a fill opening 5 through which a pressure medium container 9 has been introduced into the chamber 2. A closure assembly 7 that is attached to the pressure medium container 9 has been fitted in the fill opening 5 after filling the chamber 2 and closes this off in a liquid-tight manner. The closure assembly 7 has a pressure regulating element 10, which engages on a valve 12 of the container 9, and a drink dispensing opening 13, which is closed off by spring-loaded valve 11. The pressure regulating element 10 operates a shut-off valve 12 of the pressure medium container 9 via which pressure medium, preferably $CO_2$, is able to flow into the space 17 above the level of the beer. The pressure regulating element 10 has a piston 19 that engages on the shut-off valve 12 and that, via opening 21, is in communication with the pressurized space 17. The piston 19 is in communication with the surroundings via an opening 24.

A dispensing line 27 that is some distance away from the axis 29 of the container 1 has been placed in the drink dispensing opening 13. A riser 30 that is connected to the internal side of the dispensing opening 13, below the valve 11, is accommodated in the container 1. A projection 32 is incorporated on the base of the container 1 as an activating member on which the bottom of the pressure medium container 9 bears when fixing the closure assembly 9 to the top container wall. As a result the valve 12 is pushed against the piston 19 of the pressure regulating element and the pressure medium container 9 is activated by opening the delivery valve 12.

Figure 2:
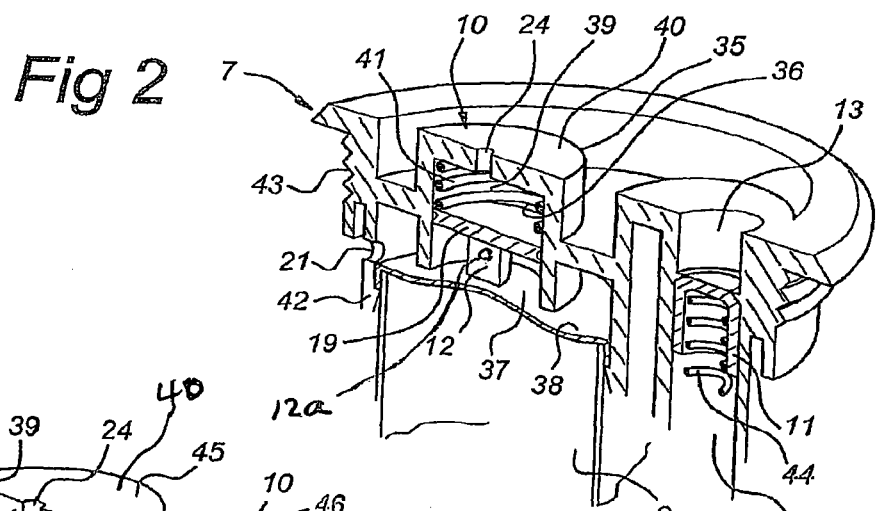
FIG. 2 shows a detail of a closure assembly with a pressure regulating element and drink dispensing valve according to the invention.
Figure 3:
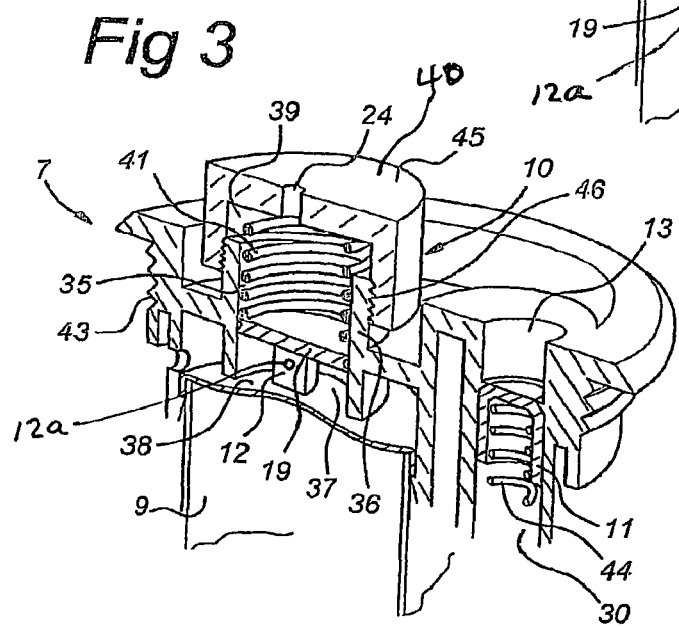
FIG. 3 shows a closure assembly similar to that in FIG. 2, where the pressure regulating element has been made adjustable.

The container 9 can contain an aerosol container known per se with a spring-loaded shut-off valve 12 that can be opened by pushing in the valve 12 to release the pressure medium through outlet 12a as shown in FIGS. 2 and 3. The pressure medium container can contain active carbon and $CO_2$ as described in NL-A 1012922 in the name of the Applicant. The capacity of the container can be between 1 and 50 liters and in a preferred embodiment is between 3 and 5 liters.

FIG. 2 shows the closure assembly 7 and shows a housing 35 of the pressure regulating element 10 in which the piston 19 is able to move up and down in a sealed manner along the inner cylindrical peripheral wall 36 of the housing 35. The valve 12 of the pressure medium container 9 is accommodated in a lower housing part 37, one edge of which bears on the upper shoulder 38 of the container 9. In an upper housing part 39, which is delimited by the cylindrical peripheral wall 36 and an end wall 40, there is a spring element 41 for applying a predetermined pressure to the valve 12 via the piston 19. The lower housing part 37 is in communication with the space 17 above the beer in the container 1 via the opening 21. The upper housing part 39 is in communication with the surroundings via the small throttle opening 24, so that ambient pressure prevails here as equilibrium pressure. In the event of variations in the internal pressure in the lower housing part 37 of the pressure regulating element 10, such as a rise as a result of an increase in temperature or a fall as a consequence of enlargement of the volume of the space 17 above the beer as a consequence of dispensing beer from the container, the piston 19 will move to restore a fixed pressure difference in the space 17 with respect to the atmosphere.

Furthermore, FIG. 2 shows the drink dispensing opening 13 incorporated in the closure assembly, which opening is closed off by the valve 11, which in the closed position thereof is pressed against the seat of the valve under spring pressure of spring 44. The top end of the riser 30 is connected to the closure assembly 7.

Figure 4:
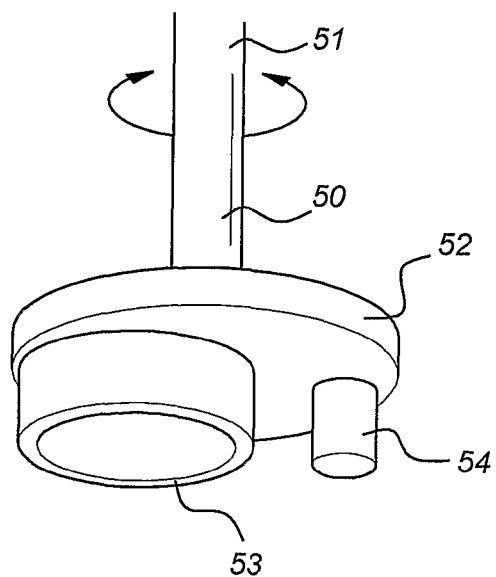
FIG. 4 shows a tool for fixing the closure assembly according to FIG. 2 and FIG. 3 to a container for carbonated drink.

As can be seen from FIG. 2, the closure assembly 7 is connected via a resilient locking catch 42 to a flanged edge of the lid of the container 9. In this way the plastic closure assembly 7 can be assembled rapidly with the container 9 before being connected to the fill opening 5 of the container 1 via screw thread 43 after filling the container with drink via this fill opening 5. When the drink has been dispensed from the container 1 and the pressure medium from the container 9 has been at least partially consumed, the container 1 can be returned to the manufacturer, where the assembled unit of closure assembly 7 and pressure medium container 9 can be removed from the container 1 using a special tool, as shown in FIG. 4. After cleaning the container 1, a new closure assembly with a full pressure medium container connected thereto can be fitted in the container 1 refilled with drink, in order to close off the fill opening 5.

FIG. 3 shows an embodiment in which the pressure regulating element 10 can be set by the user in order to obtain a desired pressure in the space 17 above the beer. To this end the pressure regulating element 10 has a cap 45 that forms the end wall 40 of the upper housing part 39. The cap 45 is connected by screw thread 46 to the cylindrical peripheral wall of the housing 35 and by tightening can increase the spring pressure on the piston 19, so that the valve 12 is pushed in further and more pressure medium is delivered from the container 9, as a result of which the pressure increases correspondingly.

FIG. 4 shows an embodiment of a tool 50 by means of which the closure assembly 7, connected to the pressure medium container 9, can be fixed in fill opening 5 of the filled container and can be removed from the empty container. The tool 50 has a support plate 52 mounted on a rotary shaft 51. The support plate has an accommodating cavity 53 for engaging on the pressure regulating element 10 and a projection 54 that drops into the drink dispensing opening 13. Accurate positioning with respect to the pressure regulation assembly 7 is obtained by means of the accommodating cavity 10 and projection 54 and a moment can be exerted on this assembly for fixing or for releasing the screw thread 43.

Figure 5:
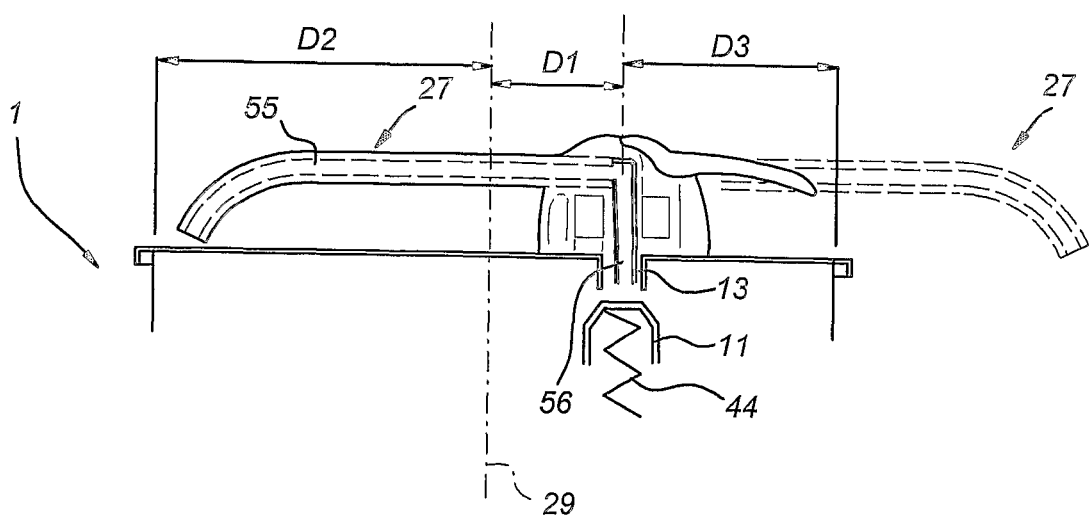
FIG. 5 shows a container for carbonated drink, where the drink dispensing line can be rotated about its vertical axis between a storage/transport position located within the periphery of the container and an operational position located outside the periphery of the container.

FIG. 5 shows a further embodiment of a container 1, where the distance D1 of the drink dispensing opening 13 from the axis 29 of the container 1 is such that a horizontal portion 55 of the dispensing line 27 protrudes a distance D2 beyond the axis 29, which distance D2 is less than the diameter of the container 1, so that in the storage/transport position shown the dispensing line 27 does not protrude with respect to the container and is thus protected against mechanical damage. In the position indicated by a broken line in FIG. 5 the dispensing line 27 extends beyond the periphery of the container because the radial distance D3 from the fill opening 13 to the periphery of the container 1 is less than the distance D2 in FIG. 5. By turning the dispensing line 27 about the vertical line section 56, which is accommodated in the drink dispensing opening such that it can be turned, the dispensing line can be placed in the dispensing position shown by the broken line. The container 1 in FIG. 5 and the dispensing line 27 can, for example, be constructed as has been described in NL-A 1012922 in the name of the Applicant.

What is claimed is:

1. Container for carbonated liquid drink provided with a chamber (2) for containing the liquid drink, a liquid drink dispensing opening (13) for dispensing the liquid drink from said drink chamber (2), a pressure medium chamber (9) for supplying pressure medium to said drink chamber (2), which pressure medium chamber (9) has an outlet that is closed by a delivery valve (12) for delivering pressure medium, and a pressure regulating element (10) connected to said delivery valve (12) for operating said delivery valve (12), wherein said pressure regulating element (10) has a housing (35) with an end wall (40), a peripheral wall (36) and a piston (19) that can be moved in said housing along said peripheral wall (36) in a sealed manner, wherein an upper housing part (39) is formed between a side of said piston (19) that faces said end wall (40) and said end wall (40), and a lower housing part (37) that at least partially surrounds said delivery valve (12) is formed at the side of said piston (19) facing away from said end wall (40), wherein said piston (19) engages said delivery valve (12) and wherein said upper housing part (39) of said housing (35) is in fluid communication with a reference pressure source, said upper housing part (39) comprising a cylindrical wall (36) with a screw head screw thread (46) and a rotatable cap (45) that is joined to said cylindrical wall (36) by a complementary screw thread, the volume of said upper housing part (39) being variable by moving said cap (45) along said cylindrical wall (36) by selective rotation of said cap (45) for setting the internal pressure in said drink chamber, wherein said pressure medium chamber (9) is in direct fluid communication with said chamber (2) via only said delivery valve (12).

2. Container according to claim 1, wherein said upper housing part (39) of said pressure regulating element (10) is in communication with the surroundings of said pressure regulating element (10), said pressure regulating element (10) being the reference pressure source.

3. Container according to claim 1, wherein a spring element (41) is accommodated between said end wall (40) of said housing (35) of said pressure regulating element (10) and said piston (19).

4. Container according to claim 1, wherein said pressure medium chamber (9) is accommodated in said liquid drink containing chamber (2) for the liquid drink.

5. Container according to claim 4, wherein said liquid drink containing chamber (2) is provided with:
an insertion opening (5) for introducing said pressure medium chamber (9) into said chamber (2), which insertion opening (5) is provided with
a first connecting element, wherein said pressure regulating element (10) has a complementary connecting element (43) for fixing to said first connecting element of said liquid drink containing chamber (2).

6. Container according to claim 5, wherein the chamber (2) is provided with:
an activating member (32), which engages on the pressure medium chamber (9) when the pressure medium chamber (9) is fixed in the chamber (2), as a result of which the delivery valve (12) is pressed against the piston (19).

7. Container according to claim 1, wherein a closure assembly (7) includes said pressure regulating element (10) and said liquid drink dispensing opening (13) that is closed off by a drink dispensing valve (11) for dispensing the contents of said chamber (2), which closure assembly (7) is connected in a sealed manner in a fill opening (5) for introducing the liquid drink and said pressure medium chamber (9) into said chamber (2).

8. Container according to claim 7, wherein said closure assembly (7) is in the form of a cylindrical component.

9. Container according to claim 1, wherein said pressure medium chamber (9) contains a pressure medium under a pressure of less than 20 bar, preferably less than 10 bar.

10. Container according to claim 9, wherein said pressure medium container (9) comprises an aerosol container containing gaseous $CO_2$, and said delivery valve (12) is an aerosol delivery valve.

11. Container according to claim 1, wherein the drink dispensing opening (13) is a distance (D1) away from an axis (29) of the chamber (2), wherein a dispensing line (27) is provided with:
an outflow section (55) located transversely to the axis of the chamber, and a vertical line section (56) that is located in the direction of the axis of the chamber and is connected to the outlet (13) such that the vertical line section can be turned, wherein the distance (D1) between the axis and the drink dispensing opening is such that in an inactive position the outflow section (55) is within a periphery of the container, and that in a dispensing position, the outflow section (55) is turned with respect to the inactive position such that the outflow section (55) protrudes beyond the periphery of the container.

12. Container according to claim 1, wherein:

said drink dispensing opening (13) is closed off by a drink dispensing valve (11), said drink dispensing opening (13) being displaced with respect to a central axis (29) of the container, wherein a dispensing line (27) is provided with:

an outflow section (55) located transversely to the axis of the container, and a vertical line section (56) that is located in the direction of the axis of the container and is connected to the drink dispensing opening (13) such that the vertical line section (56) can be turned, wherein the distance (D1) between the axis (29) and the drink dispensing opening (13) is such that in an inactive position the outflow section (55) is within a periphery of the container, and wherein in a dispensing position, the outflow section (55) is turned with respect to the inactive position such that the outflow section (55) protrudes beyond the periphery of the container.

13. Container according to claim 1, wherein said liquid drink chamber contains a liquid drink and said pressure medium chamber (9) contains a pressure medium having a pressure of less than 10 bar.

14. Container according to claim 1, wherein a spring element (41) is accommodated between said end wall (40) of said housing (35) of said pressure regulating element (10) and said piston (19).

15. Container according to claim 1, wherein an upper part of housing (39) is in fluid communication with a reference pressure source via an opening (24), preferably a small throttle opening (24).

16. Container for carbonated liquid drink provided with a chamber containing the liquid drink, a liquid drink dispensing opening for dispensing the liquid drink from said liquid drink containing chamber, a pressure medium chamber for supplying pressure medium to said liquid drink containing chamber, which pressure medium chamber has an outlet that is closed by a delivery valve for delivering pressure medium, and a pressure regulating element connected to said delivery valve for operating said delivery valve, wherein said pressure regulating element has a housing with an end wall, a peripheral wall and a piston that can be moved in said housing along said peripheral wall in a sealed manner, wherein an upper housing part is formed between a side of said piston that faces said end wall and said end wall, and a lower housing part that at least partially surrounds said delivery valve is formed at the side of said piston facing away from said end wall, wherein said piston engages said delivery valve and wherein said upper housing part of said housing is in fluid communication with a reference pressure source, and said peripheral wall of said housing is a cylindrical wall which includes a screw thread and a cap that is joined to said cylindrical wall by a complementary screw thread, the volume of said upper housing part being variable by moving said cap along said cylindrical wall by selective rotation of said cap (45) for setting the internal pressure therein, wherein said pressure medium chamber is in direct fluid communication with said liquid drink containing chamber via said delivery valve.

17. Container according to claim 15, wherein said drink chamber contains a liquid drink, and the reference pressure source is the surrounding atmosphere.

18. Container for carbonated liquid drink provided with a chamber for containing the liquid drink, a liquid drink dispensing opening for dispensing the liquid drink from said chamber, a pressure medium chamber for supplying pressure medium to said chamber, which pressure medium chamber has an outlet that is closed by a delivery valve for delivering pressure medium, and a pressure regulating element connected to said delivery valve for operating said delivery valve, wherein said pressure regulating element has a housing with an end wall, a peripheral wall and a piston that can be moved in said housing along said peripheral wall in a sealed manner, wherein an upper housing part is formed between a side of said piston that faces said end wall and said end wall, and a lower housing part that at least partially surrounds said delivery valve is formed at the side of said piston facing away from said end wall, wherein said piston engages said delivery valve and wherein said upper housing part of said housing is in fluid communication with a reference pressure source, and said peripheral wall of said housing is a cylindrical wall which includes a screw thread and a cap that is joined to said cylindrical wall by a complementary screw thread, and a spring element positioned between said end wall and said piston for applying pressure to said delivery valve, the volume of said upper housing part being variable by moving said cap along said cylindrical wall by selective rotation of said cap for setting the internal pressure provided by said spring element, wherein said pressure medium chamber is in direct fluid communication with said liquid drink containing chamber via said delivery valve.

19. The container according to claim 17, wherein said spring element is a coil spring.

20. Container according to claim 19, wherein said liquid drink chamber contains a liquid drink.

21. Container for carbonated drink provided with a chamber for containing a liquid drink, a drink dispensing opening for dispensing drink from said liquid drink chamber, a pressure medium chamber that is in direct fluid communication with said liquid drink chamber for supplying pressure medium to said chamber, which pressure medium chamber has an outlet that is closed off by a delivery valve for delivering pressure medium, and a pressure regulating element connected to said delivery valve for operating said delivery valve, wherein said pressure regulating element has a housing with an end wall, a peripheral wall and a piston that can be moved in said housing along said peripheral wall in a sealed manner, wherein an upper housing part is formed between a side of said piston that faces said end wall, and said end wall and a lower housing part that at least partially surrounds said delivery valve is formed at the side of said piston facing away from said end wall, wherein said piston engages said delivery valve and wherein said upper housing part of said housing is in fluid communication with a reference pressure source, said upper housing part comprising a cylindrical wall with a screw thread and a cap that is joined to said cylindrical wall by a complementary screw thread, the volume of said upper housing part being variable by moving said cap along said cylindrical wall by selective rotation of said cap for setting the internal pressure in said container, wherein said pressure medium chamber is provided within said container and is in direct fluid communication with said liquid drink chamber, and said cap extends at least partly outside of said chamber to facilitate manual rotation.

22. Container according to claim 21, wherein said liquid drink chamber contains a liquid drink.

23. Container for carbonated liquid drink provided with a chamber (2) for containing a liquid drink, a liquid drink dispensing opening (13) for dispensing the liquid drink from said liquid drink chamber (2), a pressure medium chamber (9) for supplying pressure medium to said liquid drink chamber (2), which pressure medium chamber (9) has an outlet that is closed by a delivery valve (12) for delivering pressure medium, and a pressure regulating element (10) connected to said delivery valve (12) for operating said delivery valve (12), wherein said pressure regulating element (10) has a housing (35) with an end wall (40), a peripheral wall (36) and a wall part having at least a movable portion which engages said valve and which can be moved in said housing in a sealed manner, wherein an upper housing part (39) is formed between a side of said wall part that faces said end wall (40) and said end wall (40), and a lower housing part (37) that at least partially surrounds said delivery valve (12) is formed at the side of said wall part facing away from said end wall (40), wherein said wall part engages said delivery valve (12) and wherein said upper housing part (39) of said housing (35) is in fluid communication with a reference pressure source, said upper housing part (39) comprising a cylindrical wall (36) with a screw thread (46) and a rotatable cap (45) that is joined to said cylindrical wall (36) by a complementary screw thread, the volume of said upper housing part (39) being variable by moving said cap (45) along said cylindrical wall (36) by selective rotation of said cap (45) for setting the internal pressure in said liquid drink chamber (2), wherein said pressure medium chamber (9) is in direct fluid communication with said liquid drink chamber (2) via only said delivery valve (12).

24. Container according to claim 23, wherein an upper part of housing (39) is in fluid communication with a reference pressure source via an opening (24), preferably a small throttle opening (24).

25. Container according to claim 24, wherein the reference pressure source is the surrounding atmosphere.

26. Container according to claim 25, wherein said liquid drink chamber contains a liquid drink.

27. Method for the production of a container containing a carbonated liquid drink, comprising the steps of:
  filling a liquid drink chamber (2) of a container (1) with the carbonated liquid drink via a fill opening;
  supplying a pressure medium chamber (9) connected to a pressure regulating element (10), said pressure regulating element (10) being connected to a delivery valve (12) for operating the delivery valve (12), wherein said pressure medium chamber is in direct fluid communication with said liquid drink containing chamber (2), via only said delivery valve (12), and said pressure regulating element (10) has a housing (35), said housing having:
  an end wall (40),
  a peripheral wall (36), and
  a piston (19) that can be moved in said housing along said peripheral wall (36) in a sealed manner, wherein:
  an upper housing part (39) is formed between said end wall (40) and a side of said piston 19 that faces said end wall 40, the volume of said upper housing part (39) being variable by selectively moving said end wall (40) toward and away from said piston (19), and
  a lower housing part 37 that at least partially surrounds said delivery valve (12) is formed at the side of said piston (19) facing away from said end wall, wherein said piston (19) engages said delivery valve for delivering pressure medium to said liquid drink containing chamber (2) and wherein said upper housing part of said housing is in fluid communication with a reference pressure source, and
  connecting said pressure regulating element (10) to said fill opening by connecting means.

28. Method according to claim 27, wherein said pressure regulating element (10) is cylindrical with an external screw thread (46) and is connected to a complementary screw thread of said fill opening by rotation.

29. Method according to claim 27, wherein when said pressure regulating element is fixed by said connecting means and said pressure medium chamber (9) is brought into engagement with an activating member in said pressure medium chamber (9) such that said delivery valve (12) of said pressure medium chamber (9) can be pushed by said piston (19).

30. Container according to claim 1 wherein said screw thread (46) on said cylindrical wall (36) is a male thread and said complementary screw thread on said rotatable cap (45) is a female thread, and said rotatable cap can be manually rotated by a user.

31. Container according to claim 16 wherein said screw thread on said cylindrical wall is a male thread and said complementary screw thread on said rotatable cap is a female thread, and said rotatable cap can be manually rotated by a user.

32. Container according to claim 18 wherein said screw thread on said cylindrical wall is a male thread and said complementary screw thread on said rotatable cap is a female thread, and said rotatable cap can be manually rotated by a user.

33. Container according to claim 21 wherein said screw thread on said cylindrical wall is a male thread and said complementary screw thread on said rotatable cap is a female thread.

34. Container according to claim 23 wherein said screw thread (46) on said cylindrical wall (36) is a male thread and said complementary screw thread on said rotatable cap (45) is a female thread, and said rotatable cap can be manually rotated by a user.

* * * * *